(12) United States Patent
Tang et al.

(10) Patent No.: US 11,121,969 B2
(45) Date of Patent: *Sep. 14, 2021

(54) ROUTING BETWEEN SOFTWARE DEFINED NETWORKS AND PHYSICAL NETWORKS

(71) Applicant: International Business Machines Corporation, Armonk, NY (US)

(72) Inventors: Gang Tang, Nanjing (CN); Shi Xin Ruan, Wuxi (CN); Zhu Na, Wuxi (CN); Ming Shuang Xian, Wuxi (CN)

(73) Assignee: International Business Machines Corporation, Armonk, NY (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/688,064

(22) Filed: Nov. 19, 2019

(65) Prior Publication Data
US 2020/0084146 A1  Mar. 12, 2020

Related U.S. Application Data

(63) Continuation of application No. 15/808,073, filed on Nov. 9, 2017, now Pat. No. 10,587,507.

(51) Int. Cl.
*H04L 12/66*    (2006.01)
*H04L 12/721*   (2013.01)
(Continued)

(52) U.S. Cl.
CPC .............. *H04L 45/66* (2013.01); *H04L 12/66* (2013.01); *H04L 45/38* (2013.01); *H04L 45/745* (2013.01);
(Continued)

(58) Field of Classification Search
CPC .............. H04L 12/462; H04L 12/4625; H04L 12/4633; H04L 12/4641; H04L 12/66;
(Continued)

(56) References Cited

U.S. PATENT DOCUMENTS 7,814,232 B2 * 10/2010 Satapati .............. H04L 61/6022
709/249
8,958,298 B2   2/2015 Zhang et al.
(Continued)

FOREIGN PATENT DOCUMENTS

WO   2016053372 A1   4/2016

OTHER PUBLICATIONS

Feng et al., "OpenRouteFlow: Enable Legacy Router as a Software-Defined Routing Service for Hybrid SDN," 2015 24th International Conference on Computer Communication and Networks (ICCCN), Aug. 3-6, 2015, 8 pages DOI: 10.1109/ICCCN.2015.7288441, http://ieeexplore.ieee.org/abstract/document/7288441/.
(Continued)

*Primary Examiner* — Alpus Hsu
(74) *Attorney, Agent, or Firm* — Jared C. Chaney

(57) ABSTRACT

A method includes receiving, at a data link layer (layer 2) gateway device configured to connect the physical network to the SDN network, routing data to a computing device, the computing device selected to receive a packet transmitted from the physical network to the SDN network; receiving, from a source element in the physical network, an address request for a layer 2 address of a router element in the SDN network, the address request including a networking layer address of the router element; transmitting, to the source element in response to receiving the address request, a layer 2 address of the router element using the routing data; receiving, from the source element, a routing request to route a packet to a destination element in the SDN network using the layer 2 address; routing, using the routing data, the received packet to the computing device to route to the destination element.

9 Claims, 7 Drawing Sheets

(51) Int. Cl.
*H04L 12/741* (2013.01)
*H04L 12/46* (2006.01)
*H04L 12/713* (2013.01)

(52) U.S. Cl.
CPC ........ *H04L 12/4633* (2013.01); *H04L 45/586* (2013.01)

(58) Field of Classification Search
CPC . H04L 29/08027; H04L 45/38; H04L 45/586; H04L 45/66; H04L 45/74; H04L 45/745; H04L 65/102; H04L 2212/00
See application file for complete search history.

(56) References Cited

U.S. PATENT DOCUMENTS

| | | | |
|---|---|---|---|
| 9,559,952 B2* | 1/2017 | Kapadia | ............... H04L 45/741 |
| 9,563,480 B2 | 2/2017 | Messerli et al. | |
| 9,825,777 B2 | 11/2017 | Shen et al. | |
| 10,069,732 B2 | 9/2018 | Narayanan et al. | |
| 10,079,752 B2 | 9/2018 | Manthiramoorthy et al. | |
| 10,243,840 B2 | 3/2019 | Babu et al. | |
| 2015/0010000 A1 | 1/2015 | Zhang et al. | |
| 2015/0100704 A1 | 4/2015 | Davie et al. | |
| 2016/0301603 A1 | 10/2016 | Park et al. | |
| 2017/0026349 A1 | 1/2017 | Smith et al. | |
| 2017/0026417 A1 | 1/2017 | Ermagan et al. | |
| 2017/0163442 A1* | 6/2017 | Shen | ................... H04L 12/4633 |
| 2017/0163598 A1* | 6/2017 | Shen | ....................... H04L 45/74 |
| 2017/0171068 A1 | 6/2017 | Morper et al. | |
| 2019/0140944 A1 | 5/2019 | Tang et al. | |

OTHER PUBLICATIONS

Kim et al., "An Architecture for SDN Flowmap Inter-operation with Legacy Protocols," 2014 International Conference on Information and Communication Technology Convergence (ICTC), Oct. 22-24, 2014, 3 pages DOI: 10.1109/ICTC.2014.6983100, http://ieeexplore.ieee.org/abstract/document/6983100/.

Hedlund, "Distributed virtual and physical routing in VMware NSX for vSphere," vmware, Network Virtualization, Posted Nov. 25, 2013, 7 pages, https://blogs.vmware.com/networkvirtualization/2013/11/distributed-virtual-and-physical-routing-in-vmware-nsx-for-vsphere.html/.

Unknown, "How to setup OpenContrail Gateway—Juniper MX, Cisco ASR and Software GW," OpenContrail Blog, May 25, 2014, 16 pages, http://www.opencontrail.org/how-to-setup-opencontrail-gateway-juniper-mx-cisco-asr-and-software-gw/.

Tang et al., "Routing Between Software Defined Networks and Physical Networks," U.S. Appl. No. 15/808,073, filed Nov. 9, 2017.

List of IBM Patents or Patent Applications Treated as Related, Dated Nov. 13, 2019, 2 pages.

* cited by examiner

ROUTING BETWEEN SOFTWARE DEFINED NETWORKS AND PHYSICAL NETWORKS

BACKGROUND

The present disclosure relates to computer networks, and more specifically, to routing between software defined networking networks and physical networks using a data link layer gateway device.

Computer networks enable computing systems to share resources using, for example, data links. The computing systems can share these resources by encapsulating data or other information in packets formatted according to a given communication protocol. The packets can be then be routed over the data links by one or more network routing device or application. In some computing environments, two or more computer networks can be linked by network gateway devices.

SUMMARY

According to embodiments of the present disclosure, a method for routing packets between a physical network and a software defined networking network (SDN network) includes receiving, at a data link layer (layer 2) gateway device configured to connect the physical network to the SDN network, routing data to a computing device of the two or more computing devices, the computing device selected to receive a packet transmitted from the physical network to the SDN network. The method then includes receiving, from a source element in the physical network, an address request for a layer 2 address of a router element in the SDN network, where the address request including a networking layer address of the router element. The method further includes transmitting, to the source element in response to receiving the address request, a layer 2 address of the router element using the routing data. The method additionally includes receiving, from the source element, a routing request to route a packet to a destination element in the SDN network using the layer 2 address. The method then includes routing, using the routing data, the received packet to the selected computing device to route to the destination element.

According to various embodiments, a system includes a software defined networking network (SDN network) comprising node element and router element, the router element having components executing on two or more computing devices. The system further includes a physical network comprising physical network elements. The system further includes a controller to control a flow network information through the SDN network. Then system additionally includes a data link layer (layer 2) gateway device configured to: receive, from the controller, routing data to a computing device of the two or more computing devices, the computing device selected to receive a packet transmitted from the physical network to the SDN network; receive, from a first element of the physical network elements, an address request for a layer 2 address of a router element in the SDN network, the address request including a networking layer address of the router element; transmit, to the first element in response to receiving the request for the data link layer address, a layer 2 address of the router element using the routing data; receive, from the first element, a routing request to route a packet to a destination element in the SDN network using the layer 2 address; and route the received packet to the selected computing device to route to the destination element.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
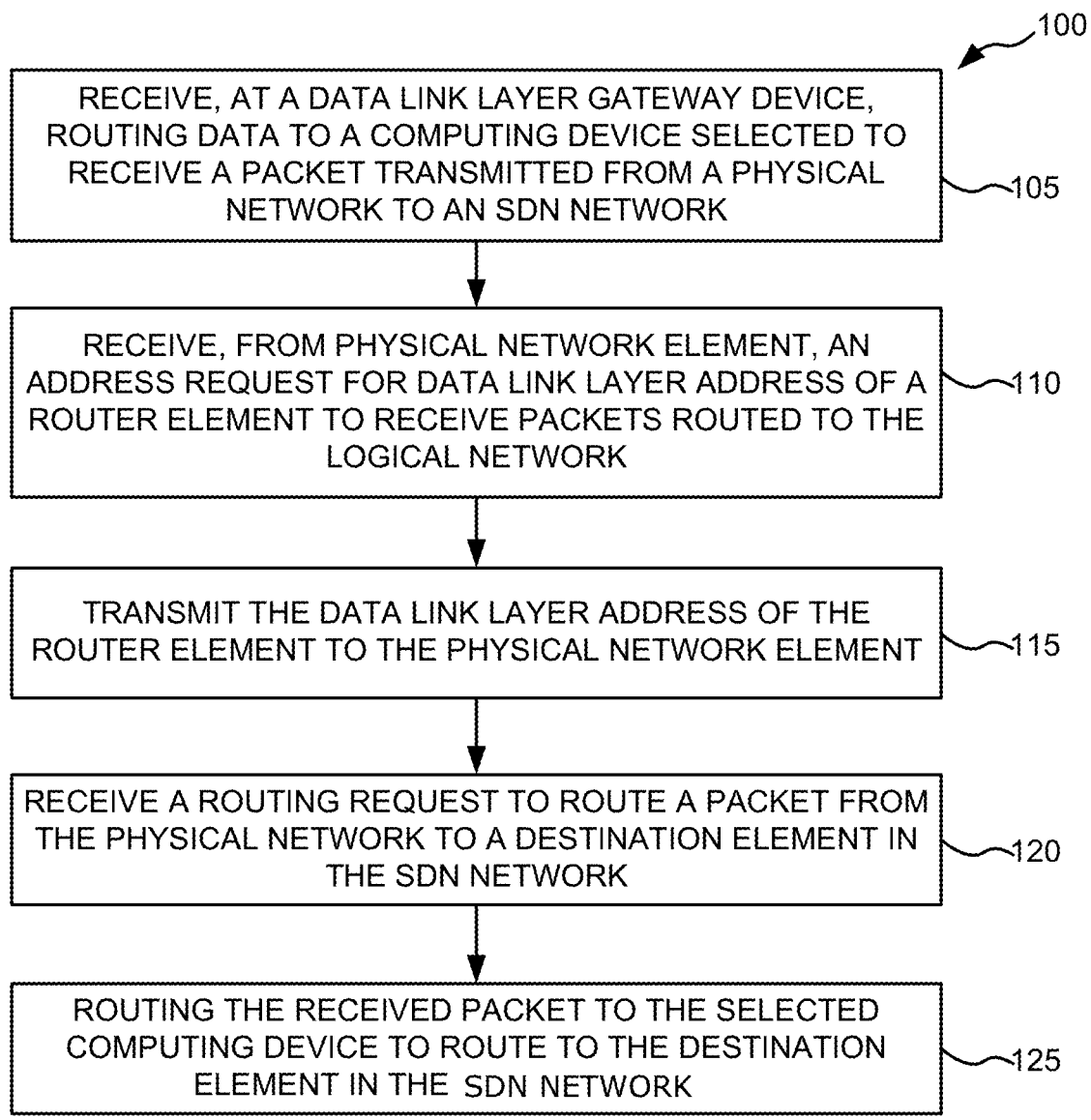
FIG. 1 depicts a set of operations for routing network traffic between software defined networking networks and physical networks using a data link layer gateway device, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer networks, more particular aspects relate to routing between software defined networks and physical networks using a data link layer bridging device. While the present disclosure is not necessarily limited to such applications, various aspects of the disclosure may be appreciated through a discussion of various examples using this context.

Computer networks can include legacy physical networks and software defined networking networks. A customer or tenant that owns, or manages, a software defined networking network (SDN network) can have reasons for connecting the SDN network to a physical network. A tenant, for example, can connect an SDN network to a physical network to enable nodes in the SDN network to access data stored on a physical server in a physical network. Hardware gateways are commonly used to connect SDN networks to physical networks due to, for example, their improved performance over software solutions. One possible hardware based solution for bridging SDN networks and physical networks considers the use of networking layer (e.g., layer 3) hardware gateways. Layer 3 hardware gateways, however, can be expensive and difficult to implement because, for example, a layer 3 hardware gateway can be required to communicate with a software defined network controller and may be required to support multiple tenants. Due, at least in part, to the drawbacks of using layer 3 hardware gateways, hardware solutions for bridging SDN networks with physical networks typically use data link layer (e.g., layer 2) hardware gateways. Layer 2 hardware gateways provide a limited connectivity solution because these gateways only bridge a given SDN network with a single physical network. Nodes in a given SDN network that use a layer 2 hardware gateway based bridging solution are not able to access resources of two or more physical networks.

Embodiments of this disclosure are based on the recognition that a layer 2 hardware gateway solution for connecting a SDN network to physical networks can be improved by using an SDN network's logical router to route packets on the behalf of the layer 2 hardware gateway. From the perspective of the SDN network, in coming packets from a physical network can be transmitted from a layer 2 hardware gateway to an SDN's logical router. The logical router can then route the incoming packet to a destination node in the SDN network. An SDN network's logical router, however, can be distributed between two or more computing devices. Consequently, it can be difficult for a layer 2 hardware gateway to determine which computing device hosting a component or instances of a distributed SDN network logical router is the correct destination for routing the incoming packets. Stated another way, it can be difficult to for a layer 2 hardware gateway to automatically determine which instance of a distributed router is the correct destination for routing incoming packets. An arbitrary selection of a destination computing device could result in communication inefficiencies or failures.

According to embodiments of the present disclosure, an SDN controller can select a computing device that hosts an instance of a distributed logical router (hereinafter, "logical router") to receive packets transmitted to the SDN network from a layer 2 hardware gateway (herein after, "layer 2 gateway") for routing. The computing device can be selected based on, for example, the computing device's relative processing load or available communication bandwidth compared to other available computing devices. The SDN controller can transmit routing information for the selected computing device to the layer 2 gateway to enable the layer 2 gateway to correctly route packets to the destination logical router (e.g., a designated port on the logical router). The routing information can include the identifier of the selected computing device, the internet protocol (IP) address of the logical router, the media access control (MAC) address of a port or interface on the logical router connected to the SDN network, and the identifier of the logical switch or software defined network associated with logical router interface. The layer 2 gateway can then serve as a proxy for responding to address resolution protocol (ARP) requests for the logical router (e.g., the logical router port). More specifically, in response to receiving an ARP request from a an element in a physical network, the layer 2 gateway can use the routing information to provide the MAC address of the logical router to the physical network element. When the physical network element transmits a packet to the layer 2 gateway for routing to a node in the SDN network, the layer 2 gateway can use the MAC address in the packet and the routing information to route the packet to the selected computing device (e.g., to the selected instance of the logical router) through a network tunnel. The logical router can then route the packet to the destination node in an SDN network.

According to various embodiments, an SDN controller can select a logical router location (e.g., a computing device hosting an instance of a logical router) for each SDN network (e.g., logical network) managed by the SDN controller and mapped to a physical network. The SDN controller can dynamically chose the logical router location based on runtime resource utilization of computing devices hosting the logical router. Examples of resources that can be used to select a logical router location include central processing unit (CPU) utilization, memory utilization, and used network interface card (NIC) bandwidth.

As used herein, SDN is a networking technology that physically decouples the system that makes decisions about where traffic is routed (e.g., the network control plane) from the underlying systems that forwards traffic to a given destination (e.g., the network's forwarding plane). This decoupling can enable network administrators to dynamically and programmatically initialize, control, modify, and otherwise manage network behavior.

SDN networks are logical networks (e.g., components of larger networks that appear as a single network entity) that are instantiated in a software layer of one or more computing devices. SDN networks can be instantiated according to a process similar to how virtual machines are instantiated on computing devices. SDN networks can include logical network elements, such as logical switches, logical routers, and logical nodes. The elements of a logical network can execute on one or more computing devices. SDN network elements executing on different computing devices can communicate through a network communication tunnel to give the appearance of a single unified component or network. A network tunnel can be generated by encapsulating packets assembled according to a communication protocol known to the SDN network in another packet assembled using another communication protocol known to underlying network connecting disparate computing devices. The resultant packet can then be routed over the underlying network.

An SDN controller is a software application that maintains a global view of each SND network in an SDN solution. The SDN controller can appear to logical network elements as a single logical switch. The SDN controller uses a set of protocols to control the flow of traffic in SDN networks by configuring physical network devices and selecting routes for forwarding network traffic. Communication between elements of an SDN network, including applications that use the SDN network, and network devices are processed through the SDN controller. The SDN controller is aware of each network element (physical or logic) associated with an SDN network.

A physical network is a network where the network control plan and the forwarding plane exists in the same physical network devices. These networks may include physical switches or routers having firmware that determines the routes for forwarding packets and then forwards the packets along the determined routes. Physical networks may be used to connect computing systems and resources, such as physical servers and network storage devices. Physical networks can be referred to as legacy networks and traditional networks.

As used herein, data link layer (e.g., layer 2) and network layer (e.g., layer 3) refer to corresponding layers of the Open Systems Interconnection model for data communications.

Figure 2:
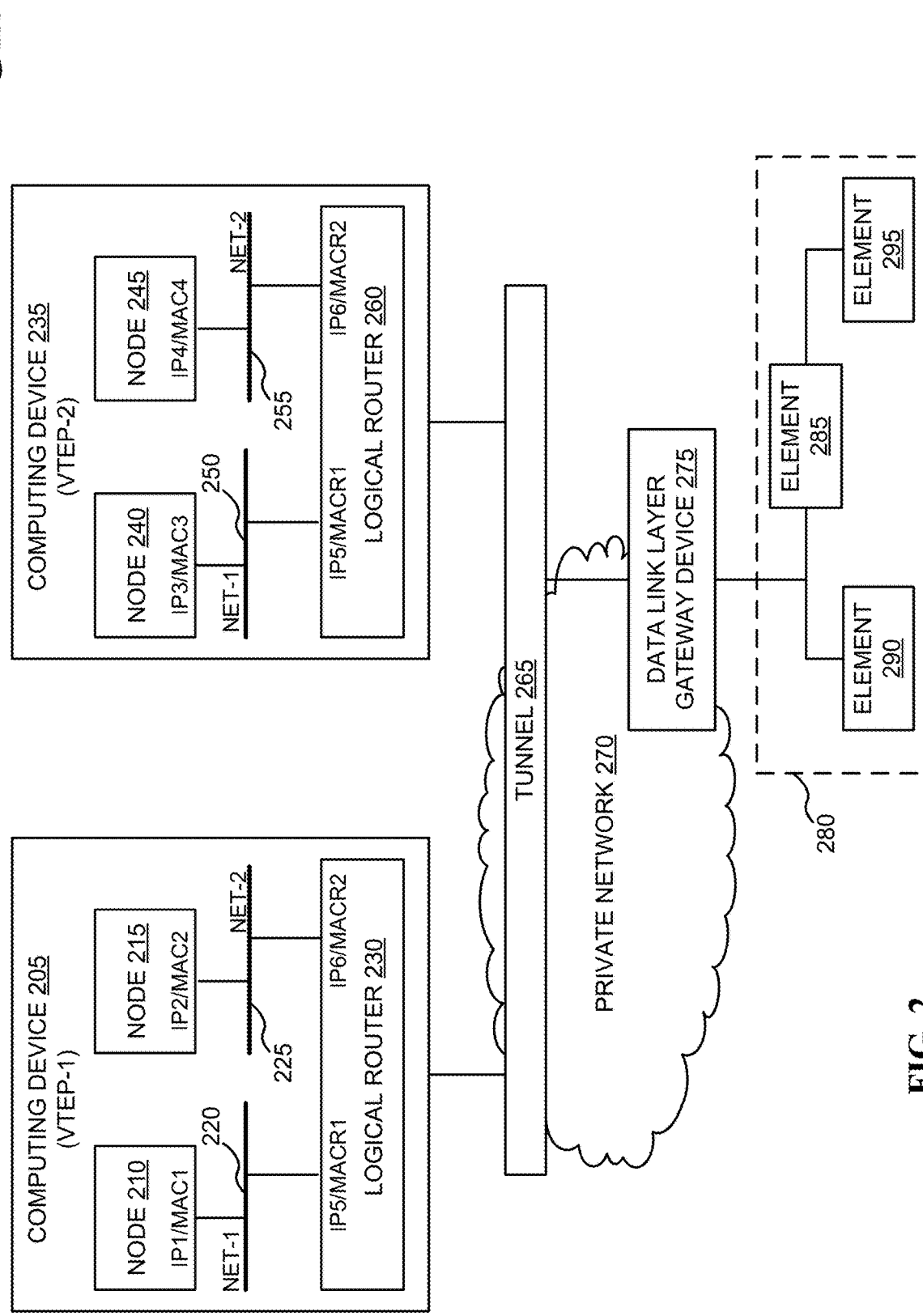
FIG. 2 depicts a system for routing network traffic between software defined networking networks and physical networks using a data link layer gateway device, according to various embodiments.

Referring now to the figures, FIG. 1 depicts a set of operations 100 for routing network traffic between SDN networks and physical networks using a layer 2 gateway device, according to various embodiments. The operations 100 can be executed by a layer 2 gateway device such as the layer 2 gateway 275 (FIG. 2). In some embodiments, the operations 100 can be executed by other devices configured to bridge physical networks and SDN networks using a layer 2 routing protocol. Computer executable instructions for executing the operations 100 can be embodied in software, firmware, and in electronic circuits of the layer 2 gateway device (hereinafter, layer 2 gateway). The operations 100 can be executed by actuating one or more circuits in the layer 2 gateway to execute the embodied instructions. Except for the modifications described herein, network packets (hereinafter, packets) routed to, and from, the layer 2 gateway can be constructed and routed, at least in part, according to known layer 2 routing protocols.

At operation 105, the layer 2 gateway can receive routing data to a computing device selected to receive a packet transmitted from a physical network to an SDN network. The routing data can be transmitted by an SDN controller associated with the SDN network to the layer 2 gateway in response to a logical router port being added to the SDN network's logical router. In some embodiments, the SDN controller can transmit the routing data in response to determining that the added logic router port is mapped to a physical network through the layer 2 gateway. A logical router port is be associated with, or connected to, a single SDN network. All elements of a given SDN network can be directly, or indirectly, coupled or connected to the same logical router port. Mapping the added port to the physical network can enable the physical to appear to elements of the SDN network as an integrated component of the SDN network.

An SDN Network's logical router is a distributed router having instances executing on one or more computing devices (e.g., virtual tunnel endpoints). Prior to transmitting the routing data for a selected computing device, the SDN controller can select a location for the logical router (e.g., a location for an instance of the logical router). The location of the router can be a computing device that is determined to have the most resource available to route packets received from the layer 2 gateway. The SDN controller can select a computing device as the location of the logical router according to one or more of the following criteria: 1) the computing device hosts a logical router port connected to a logical switch (e.g., a logical network) that is associated with a physical network (e.g., a virtual local area network); 2) the workload of the computing device is lower than the workload of other available computing devices; 3) the underlying bandwidth from the layer 2 gateway to the computing device is greater than the corresponding bandwidths associated with other available computing devices; 4) the computing device is selected as the logical router location for fewer physical networks than other available computing devices. In some embodiments, a computing device can be selected as the location of the logical router when one or more of these criteria are satisfied (e.g., evaluate to true). In other embodiments, other thresholds for selecting the computing device based on these criteria can be used.

Figure 3:
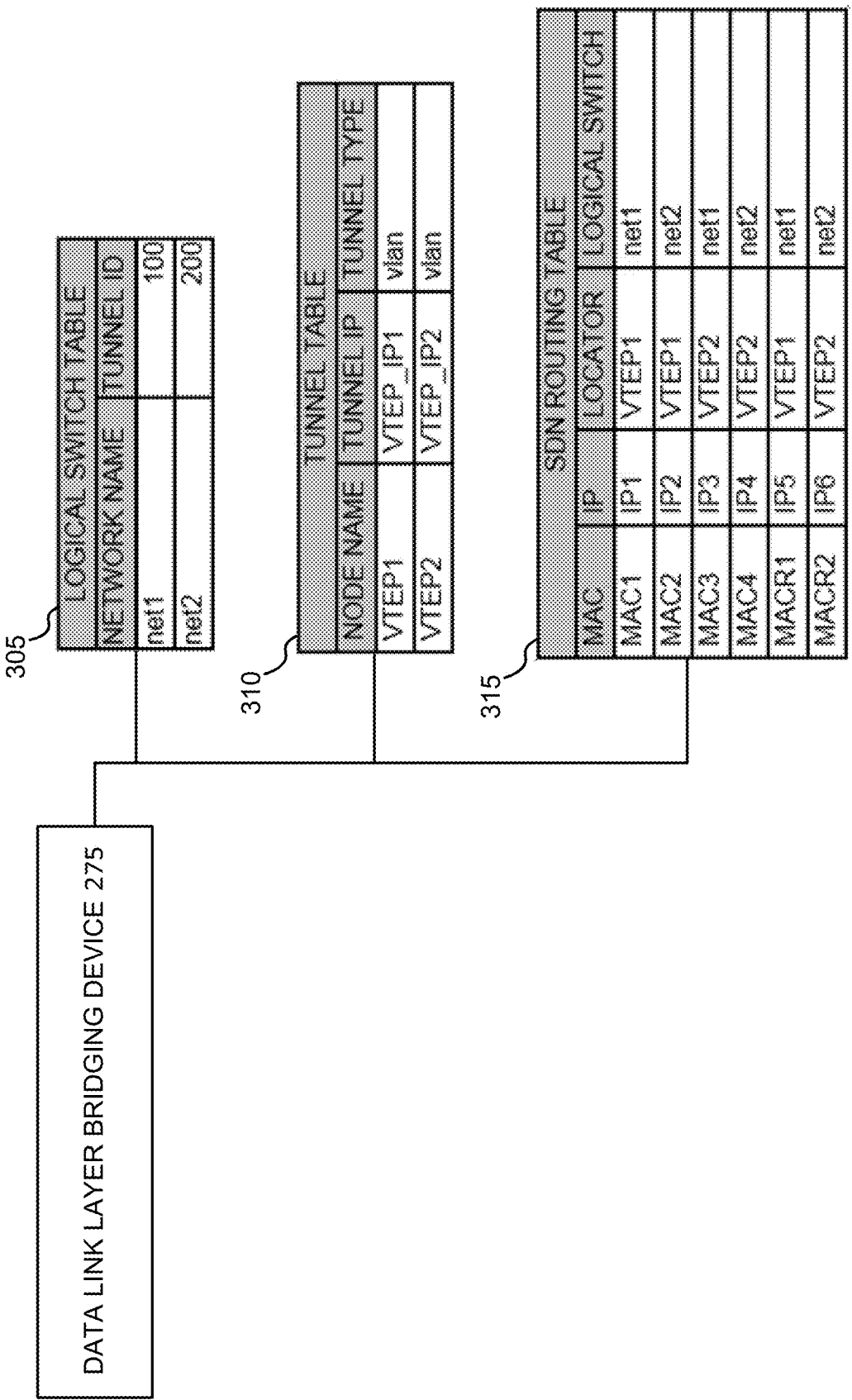
FIG. 3 depicts a set of tables included in a data link layer gateway device used for routing network traffic between software defined networking network and physical networks, according to various embodiments.

Returning to operation 105, the received routing data can include logical router interface or port information generated by the SDN controller. The routing data (e.g., the interface information) can include the MAC address of logical router interface (e.g., the logical router port), the IP address of the router interface, an identifier of a logical switch connected to the router interface, and an identifier of the computing device selected to receive and route packets forwarded by the layer 2 gateway to the SDN network. The routing data can be transmitted to, and received by, the layer 2 gateway in substantially the same way that logical port interface information is transmitted to, and received by, the layer 2 gateway. In some embodiments, the layer 2 gateway stores the routing data in a table, such as the SDN routing table 315 (FIG. 3).

At operation 110, the layer 2 gateway can receive an address request for a layer 2 address of a router element to receive packets routed from a physical network element (e.g., a source element) to the SDN network. The physical network element can be an element in a physical network that is not mapped to the SDN network. The physical network element, for example, can be any computing element in a physical network, such as a router and a computer server. In some embodiments, the physical network element can be programmed with the IP address of, for example, the next hop router (or gateway) to the SDN network. The IP address can be the IP address of a logic router port connected to, or associated with, the SDN network. In some embodiments, the address request can include the IP address (e.g., a network layer address) of the logical router port. For example, the received request is an address resolution protocol (ARP) request, including the programmed IP address.

At operation 115, the layer 2 gateway can transmit the layer 2 address (e.g., a MAC address) to the physical network element. Transmitting the layer 2 address can include using the layer 3 address included the address request as an index into the SDN routing table to determine the layer 2 address of a logical router corresponding to the layer 3 address.

At operation 120, the layer 2 gateway can receive a routing request to route a packet from the physical network (e.g., from a source element in the physical network) to a destination element in the SDN network. The destination element can be a node element in the SDN network. In some embodiments, the routing request is a layer 2 packet designating the layer 2 address of router element in the SDN network as the next hop router element.

At operation 125, the layer 2 gateway can route the packet received in the routing request to the destination element in the SDN network. Routing the received packet can include using the layer 2 address of the next hop router to identify a computing device selected to receive packets routed to the SDN network (e.g., the layer 2 address can be used to index an SDN routing table). The identifier of the selected computing device can then be used to determine tunnel information (e.g., packet header information) for routing the received packet to the selected computing device. The tunnel information can include a tunnel identifier of a network tunnel associated with a logical switch (e.g., a SDN network or subnetwork) connected to the next hop router (e.g., the router port designated by the layer 2 address), a tunnel IP address (e.g., the IP address of the selected computing device), and an indication of the type of tunnel associated with the layer 2 address.

Routing the received packet can further include using the tunnel information to generate packet header information for routing the received packet through a network tunnel to the selected computing device. The header information can correspond to, for example, a Virtual Extensible Local Area Network header. The layer 2 gateway can use the header information to encapsulate the received packet. The layer 2 gateway can then forward the encapsulated packet to the selected computing device.

After receiving the encapsulated packet from the layer 2 gateway, the selected computing device can remove the header information from the encapsulated packet and forward the original received packet to the logical router. The logical router then forwards the packet to the destination element.

According to various embodiments, an instance of a logical router executing on a computing device selected to receive packets forwarded to an SDN network can be modified with routing information (e.g., static routing information) for forwarding packets from the SDN network to a physical network element. The routing information can indicate that the layer 3 address of the next hop routing device for routing a packet to a physical network element is, for example, the IP address of the logical router (or logical router port) designated to receive packets from the layer 2 gateway, as described herein.

Whether a logical router is modified with a static route to enable packets to be routed from an SDN network to a physical network element can depend, at least in part, on whether the SDN network is mapped to another physical network element. The modification to the logical router can also depend on whether the destination physical network element is mapped to another SDN network (e.g., a different SDN network than the SDN network transmitting the packet). A logical router can forward a packet from an SDN network to a layer 2 gateway for routing to a physical network element without the logical router being modified with static routing information when the SDN network transmitting the packet is not mapped and the physical network element is mapped. Modifying the logical router with static routing information can be necessary when the destination physical network element is unmapped.

In some embodiments, executing the operations 100 can include mapping a first physical network element to an SDN network through a network tunnel connecting elements of the SDN network executing on two or more computing devices. The operations 100 can then be executed to enable a second physical network element in a physical network different from the physical network having the first physical network element to share resources, or to communicate, with the SDN network.

In some embodiments, the SDN networks described herein can include two or more SDN networks. The logical routers described herein, for example, can have two or more logical router ports, with each logical router port connected to a different SDN network.

According to various embodiments, a SDN controller can dynamically select a new computing device to receive packets from a layer 2 gateway for routing. The SDN controller can dynamically select a new computing device by monitoring the workload of the new computing device and the previously selected computing device, and determining that the workload of the previously selected computing device exceeds the workload of the new computing device. The SDN controller can dynamically select a new computing device in response to monitoring communication with the previously selected computing device and determining that the previously selected computing device is unreachable due to, for example, an operating fault.

FIG. 2 depicts a system 200 for routing network traffic between SDN networks and physical networks using a layer 2 gateway device, according to various embodiments. The system 200 can include computing device 205, computing device 235, private network 270, layer 2 gateway device 275, and physical network 280. Except for the modifications described herein, the components of the system 200 can communicate by exchanging network packets constructed and routed according to known data communication protocols.

Figure 7:
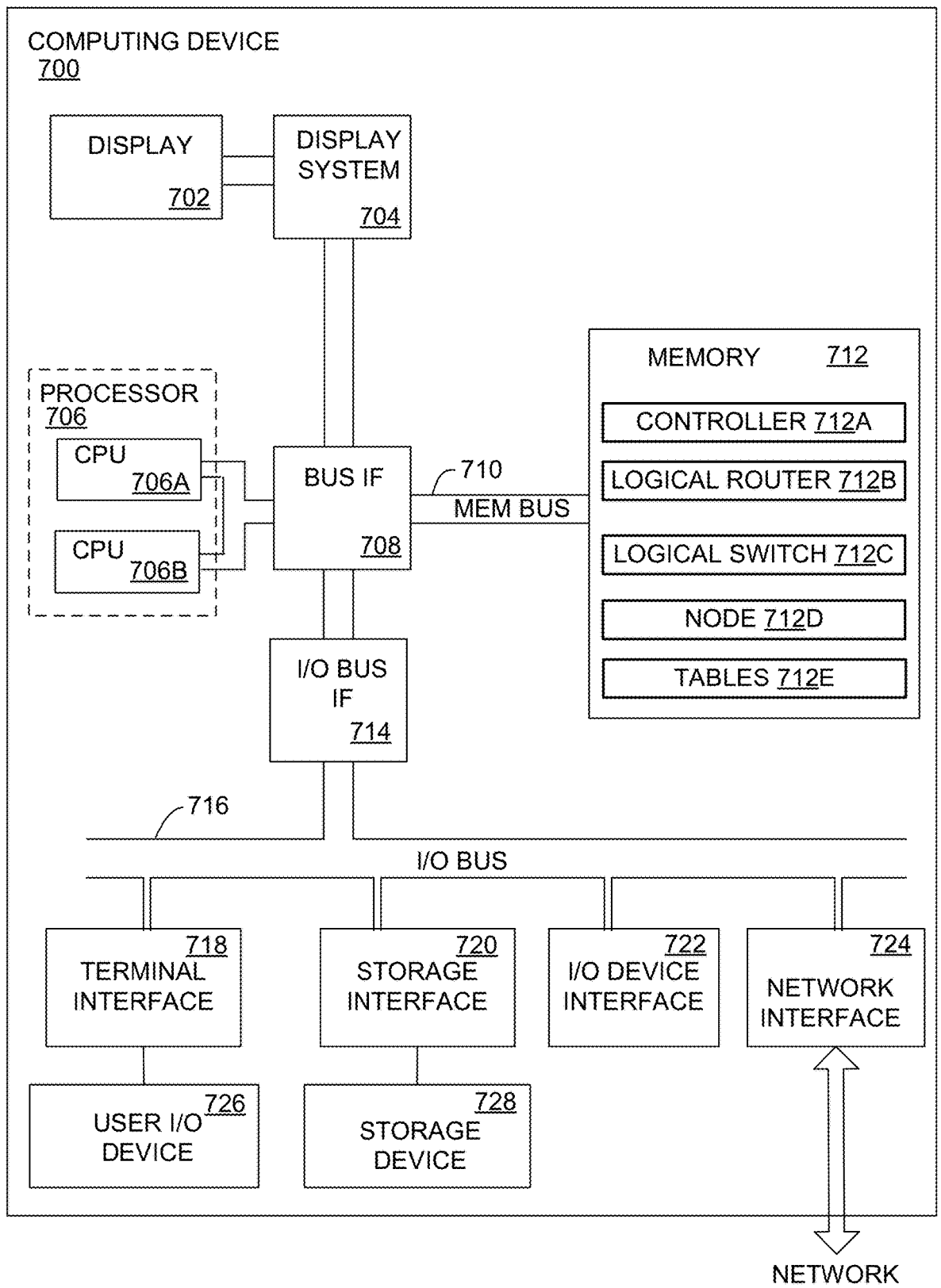
FIG. 7 depicts a block diagram of a computing system or computing device having components useful for routing network traffic between software defined networks and physical networks using a data link layer bridging device, according to various embodiments.

The computing device 205 and the computing device 235 can be computing nodes, servers, or other computing devices, such as the computing device 700 (FIG. 7). The computing device 205 and the computing device 235 can a include combination of software and hardware components configured to implement and execute the operations described herein. The computing device 205 can include node 210, node 215, logical switch 220, logical switch 225, and logical router 230. Similarly, the computing device 235 can include node 240, node 245, logical switch 250, logical switch 255, and logical router 260. The components within each of the computing device 205 and the computing device 235 can communicate with, or be coupled to, each other via hardware (e.g., a communication bus, network adapter, or physical memory) or software (e.g., a software sockets and application interfaces) communication channels, as described herein. In some embodiments, the components of the computing device 205 and the computing device 235 can execute on a software layer with the respective computing devices. The computing device 205 and the computing device 235 can be virtual terminal endpoints, as known in the art.

Node 210 and node 215 are logical nodes executing on the computing device 205, while node 240 and node 245 are logical nodes executing on the computing device 235. The logical nodes can be software applications that utilize the resources of an SDN network. In some embodiments, the logical nodes can a virtual machine or an application executing within a virtual machine. Each logical node can be have a layer 2 address (e.g., a MAC address) and a layer 3 address (e.g., an IP address).

Logical switch 220 and logical switch 250 are components of a single distributed logical switch (e.g., a logical network switch) executing on the computing device 205 and the computing device 235, respectively. Network tunnel 265 enables this distributed logic switch to be seen by the node 210 and node 240 as a single logical switch. Similarly logical switch 225 and logical switch 255 are components of a single distributed logical switch executing on the computing device 205 and the computing device 235, respectively. Network tunnel 265 enables this logic switch to be seen by the node 215 and node 245 as a single logical switch. In some embodiments, a distributed logical switch can form a subnetwork (e.g., subnet), with each logical node connected to the distributed logical switch belonging to the same subnet. In some embodiments, the distributed logical switch can be a component of an SDN controller.

The logical router 230 and the logical router 260 are components (e.g., instances) of a single distributed logical router executing on the computing device 205 and the computing device 235, respectively. Network tunnel 265 enables this logic router to be seen by the connected logical switches as a single logical router. In some embodiments, each port of the logical router is distributed across, or has an identical instance on, each computing device hosting a component of the logical router. For example, logical switch 220 and logical switch 250 are connected to the same logical router port (e.g., logical router port IP5/MACR1) on the distributed logical router formed by logical router 230 and logical router 260. Each logical router port can have a unique layer 2 address and a unique layer 3 address. A logical switch connected to a specific logical router port can represent a specific SDN network, with each node connected to the logical switch would belong to the same SDN network.

The logical router 230 can route packets between SDN networks (e.g., between SDN network NET-1 and SDN network NET-2). The logical router 230 can be configured according the techniques described herein to route packets between SDN networks and physical networks. The logical router 230, for example, can be programmed with static routes to one or more physical network elements, as described herein. The logical router 230 can also receive encapsulated packets from the layer 2 gateway device 275 to route to, for example, one or more logical nodes.

The private network 270 can be a data communication network that uses one or more communication protocols to enable computing devices to share resources, as described herein.

The data link layer gateway device 275 can be a layer 2 gateway configured to execute the operations described herein. The layer 2 gateway 275 can receive, from an SDN controller, routing data to a computing device (e.g., computing device 205) of the two or more computing devices hosting an SND network (e.g., computing device 205 and computing device 235), where the computing device is selected to receive a packet transmitted from a physical network to an SDN network (e.g., SDN network NET-1). The layer 2 gateway 275 can further receive, from a physical network element (e.g., physical network element 295), a request for a data link layer address (e.g., MACR1) of a router element (e.g., logical router 230) in the SDN network. The layer 2 gateway 275 can then transmit, to the physical network element in response to receiving the request for the data link layer address, a data link layer address of the router element using the received routing data. The layer 2 gateway 275 can then receive, from the physical network element, a routing request to route a packet to a destination element (e.g., node 210) in the SDN network using the data link layer address. The layer 2 gateway 275 can further route the received packet to the computing device to route to the destination element using the routing data.

Physical network 280 can be a legacy or traditional network, as described herein. In some embodiments, the physical network 280 can include two or more physical networks. A first physical network, for example, can include physical network element 290 (e.g., a server). A second network can include network element 295 coupled to the first physical network by physical network element 285 (e.g., a physical router). In some embodiments one or more physical network elements (e.g., physical network element 290) can be mapped to a SDN network (e.g., SDN network NET-1), as described herein. Elements of the physical network 280 can be configured to exchange resources with one or more SDN networks using the layer 2 gateway, as described herein.

Although not shown, the system 200 include an SDN controller to manage the SDN network works, as described herein. The SDN controller can be an application executing on computing device 205 and computing device 235. In some embodiments, the SDN controller can execute on a third computing device.

FIG. 3 depicts a set of tables included in a data link layer gateway device 205 used for routing network traffic between SDN networks and physical networks, according to various embodiments. Each table can be populated in response the layer 2 gateway device receiving routing or other networking information from an SDN controller, as described herein.

The logical switch table 305 associates an SDN network with a network tunnel using corresponding network and tunnel identifiers. The Tunnel Table 310 associates a virtual tunnel endpoint (e.g., a computing device hosting components of a one or more SDN networks) with a layer 3 address and a tunneling or encapsulating technique (e.g., a tunnel type). The SDN Routing Table 315 can associate an interface of a SDN network component with an associated layer 2 address, layer 3 address, virtual tunnel endpoint, and logical switch. According to various embodiments, the SND Routing Table 315 further associates a logical router port with an associated layer 2 address, layer 3 address, virtual tunnel endpoint, and logical switch.

Figure 4:
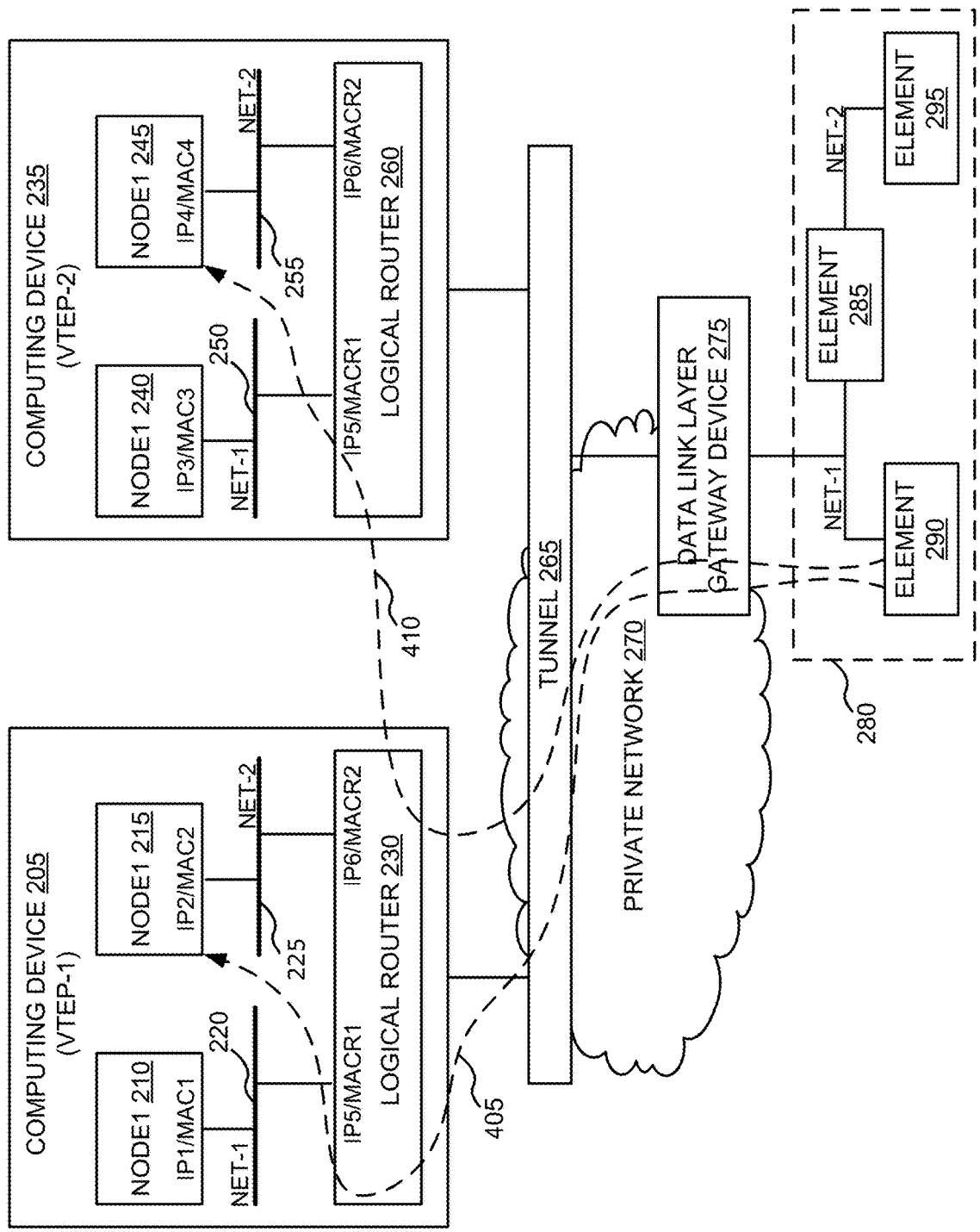
FIG. 4 depicts an example of set of routes traversed by packets transmitted from a mapped physical network element to an unmapped software defined networking network, according to various embodiments.

FIG. 4 depicts an example set of routes (e.g., routes 405 and 410) traversed by packets transmitted from a mapped physical network element 290 to an unmapped SDN network (e.g., SDN network NET-2), according to various embodiments. In this example, the physical network element 290 is mapped to SDN network NET-1 and the computing device 205 is selected by an SDN controller as the host of the logical router designated to route packets to the SDN networks, as described herein. More specifically, logical router port IP5/MACR1 supporting the NET-1 is the designated router port.

According to route 405, the physical network element 290 can transmit a packet to SDN network element node 215 in unmapped SDN network Net-2 by first requesting the layer 2 address of the designated router. The layer 2 gateway 275 responds with the layer 2 address for the designated router (e.g., MACR1). The physical network element transmits a packet with MACR1 as the destination layer 2 address and node 215 as the payload destination to the layer 2 gateway 275. The layer 2 gateway 275 then encapsulates the packet and forwards it over the private network 270 through the network tunnel 265 to computing device 205. Computing device 205 removes the encapsulating information from the encapsulated packet and forwards the packet to logical router port IP5/MACR1. The logical router then forwards the packet to node 215 through logical router port IP6/MACR2. A packet transmitted to node 245 takes a similar route (e.g., route 410), with the exception that the logical router 230 on computing device 205 forwards the packet to back through the tunnel 265 to the logical router 260 on computing device 235 to forward to node 245.

Figure 5:
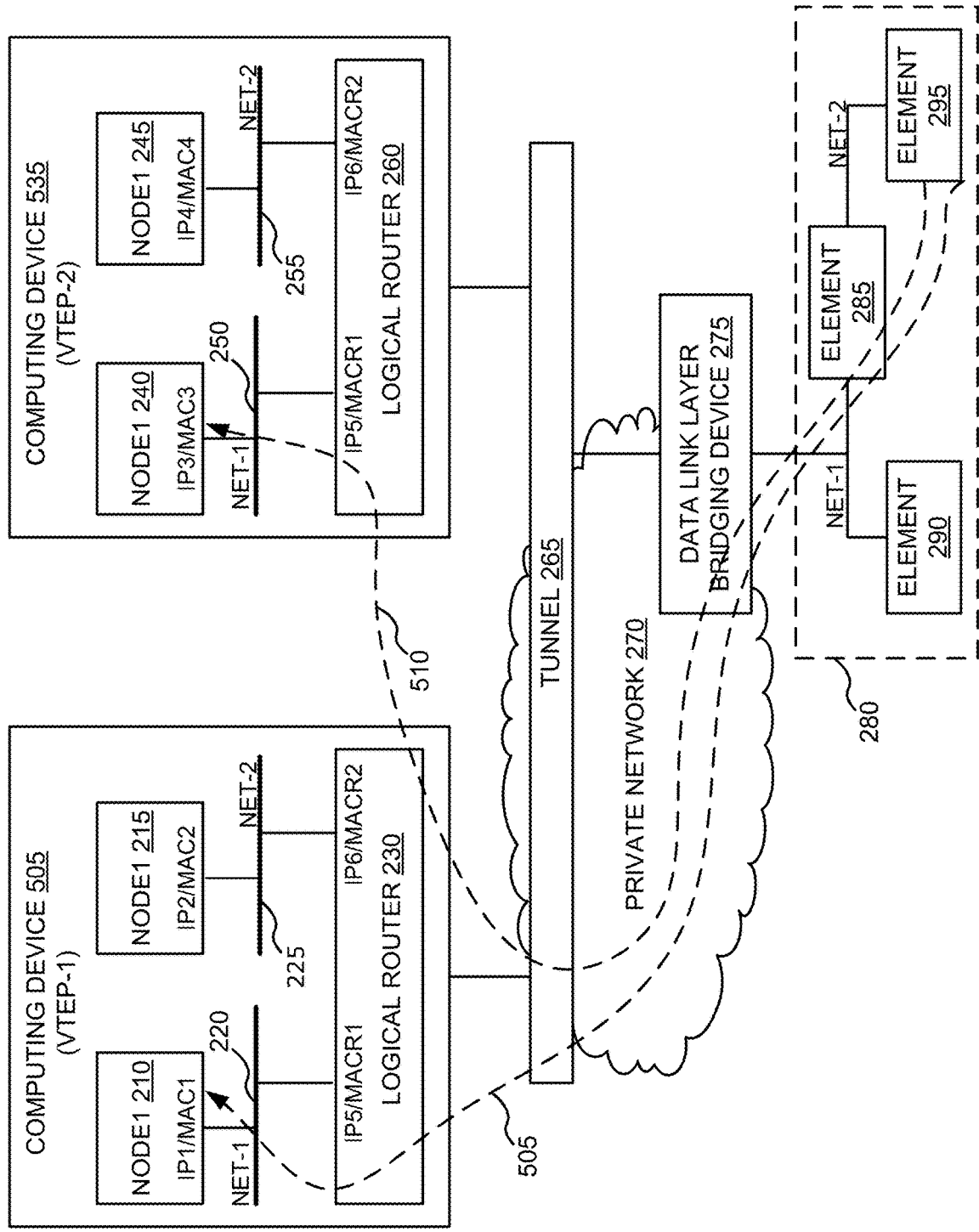
FIG. 5 depicts an example of set of routes traversed by packets transmitted from an unmapped physical network element to a mapped software defined networking network, according to various embodiments.

FIG. 5 depicts an example set of routes (e.g., routes 505 and 510) traversed by packets transmitted from an unmapped physical network element to a mapped SDN network, according to various embodiments. In this example, the computing device 205 is selected by an SDN controller as the host of the logical router designated to route packets to the SDN networks. More specifically, logical router port IP5/MACR1 supporting the NET-1 is the designated router port. The unmapped physical network element 295 can transmit a packet to SDN network element node 210 and node 240 in mapped SDN network Net-1. The steps for transmitting packets to the mapped SDN network are substantially similar to the corresponding steps discussed in reference to FIG. 4.

Figure 6:
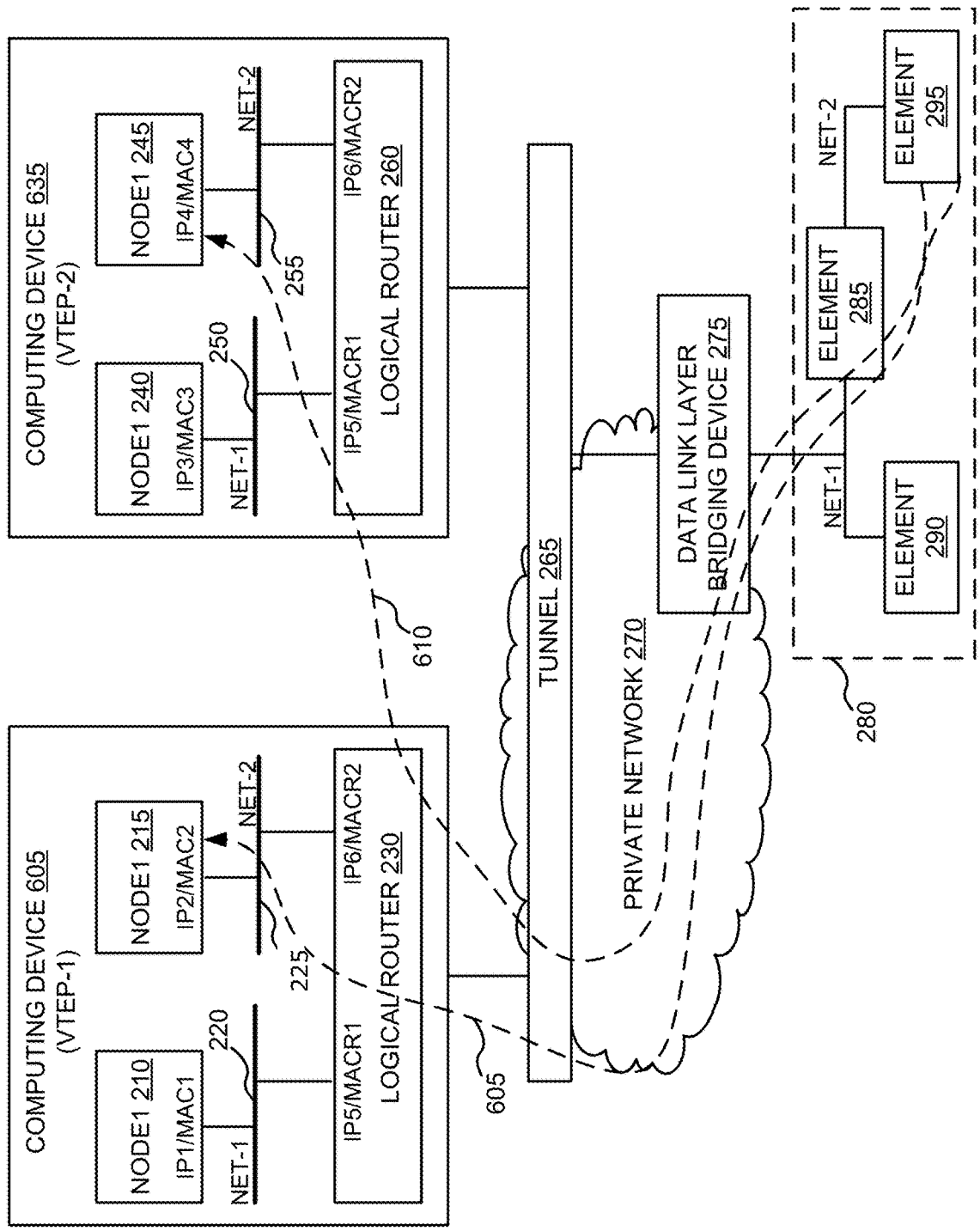
FIG. 6 depicts an example of set of routes traversed by packets transmitted from an unmapped physical network element to an unmapped software defined networking network, according to various embodiments.

FIG. 6 depicts an example of set of routes (e.g., routes 605 and 610) traversed by packets transmitted from an unmapped physical network element to an unmapped SDN network, according to various embodiments. In this example, the computing device 205 is selected by an SDN controller as the host of the logical router designated to route packets to the SDN networks. More specifically, logical router port IP5/MACR1 supporting the NET-1 is the designated router port. The unmapped physical network element 295 can transmit a packet to SDN network element node 215 and node 245 in unmapped SDN network Net-2. The steps for transmitting packets to the mapped SDN network are substantially similar to the corresponding steps discussed in reference to FIG. 4.

FIG. 7 depicts a block diagram of a computing system or computing device having components useful for routing network traffic between software defined networks and physical networks using a data link layer bridging device, according to various embodiments. The components of the computing device 700 can include one or more processors 706, a memory 712, a terminal interface 718, a storage interface 720, an Input/Output ("I/O") device interface 722, and a network interface 724, all of which are communicatively coupled, directly or indirectly, for inter-component communication via a memory bus 710, an I/O bus 716, bus interface unit ("IF") 708, and an I/O bus interface unit 714.

The computing device 700 may include one or more general-purpose programmable central processing units (CPUs) 706A and 706B, herein generically referred to as the processor 706. In an embodiment, the computing device 700 may contain multiple processors; however, in another embodiment, the computing device 700 may alternatively be a single CPU device. Each processor 706 executes instructions stored in the memory 712.

The computing device 700 may include a bus interface unit 708 to handle communications among the processor 706, the memory 712, the display system 704, and the I/O bus interface unit 714. The I/O bus interface unit 714 may be coupled with the I/O bus 716 for transferring data to and from the various I/O units. The I/O bus interface unit 114 may communicate with multiple I/O interface units 718, 720, 722, and 724, which are also known as I/O processors (IOPs) or I/O adapters (IOAs), through the I/O bus 716. The display system 704 may include a display controller, a display memory, or both. The display controller may provide video, audio, or both types of data to a display device 702. The display memory may be a dedicated memory for buffering video data. The display system 104 may be coupled with a display device 702, such as a standalone display screen, computer monitor, television, a tablet or handheld device display, or another other displayable device. In an embodiment, the display device 102 may include one or more speakers for rendering audio. Alternatively, one or more speakers for rendering audio may be coupled with an I/O interface unit. In alternate embodiments, one or more functions provided by the display system 704 may be on board an integrated circuit that also includes the processor 706. In addition, one or more of the functions provided by the bus interface unit 708 may be on board an integrated circuit that also includes the processor 706.

The I/O interface units support communication with a variety of storage and I/O devices. For example, the terminal interface unit 718 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 726 and the computing device 700, may receive output data via the user output devices. For example, a user interface may be presented via the user I/O device 726, such as displayed on a display device, played via a speaker, or printed via a printer.

The storage interface 720 supports the attachment of one or more disk drives or direct access storage devices 728 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 728 may be implemented via any type of secondary storage device. The contents of the memory 712, or any portion thereof, may be stored to and retrieved from the storage device 728 as needed. The I/O device interface 722 provides an interface to any of various other I/O devices or devices of other types, such as printers or fax machines. The network interface 724 provides one or more communication paths from the computing device 700 to other digital devices and computer systems.

Although the computing device 700 shown in FIG. 7 illustrates a particular bus structure providing a direct communication path among the processors 706, the memory 712, the bus interface 708, the display system 704, and the I/O bus interface unit 714, in alternative embodiments the computing device 700 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 714 and the I/O bus 708 are shown as single respective units, the computing device 700, may include multiple I/O bus interface units 714 and/or multiple I/O buses 716. While multiple I/O interface units are shown, which separate the I/O bus 716 from various communication paths running to the various I/O devices, in other embodiments, some or all of the I/O devices are connected directly to one or more system I/O buses.

In various embodiments, the computing device 700 is a multi-user mainframe computer system, a single-user system, or a server computer or similar device that has little or no direct user interface, but receives requests from other computer systems (clients). In other embodiments, the computing device 700 may be implemented as a desktop computer, portable computer, laptop or notebook computer, tablet computer, pocket computer, telephone, smart phone, or any other suitable type of electronic device.

In an embodiment, the memory 712 may include a random-access semiconductor memory, storage device, or storage medium (either volatile or non-volatile) for storing or encoding data and programs. In another embodiment, the memory 712 represents the entire virtual memory of the computing device 700, and may also include the virtual memory of other computer systems coupled to the computing device 700 or connected via a network 730. The memory 712 may be a single monolithic entity, but in other embodiments the memory 712 may include a hierarchy of caches and other memory devices. For example, memory may exist in multiple levels of caches, and these caches may be further divided by function, so that one cache holds instructions while another holds non-instruction data, which is used by the processor. Memory 712 may be further distributed and associated with different CPUs or sets of CPUs, as is known in any various so-called non-uniform memory access (NUMA) computer architectures.

The memory 712 may store all or a portion of the components and data shown in FIG. 1-6. For example, the memory 712 may include a controller 712A, logical router 712B, logical switch 712C, logical node 712D, and tables 712E. The controller 712A may include computer code executable by the processors 706 to implement or otherwise carryout or execute a set of operations for routing network traffic between SDN networks and physical networks using a data link layer gateway device, as described herein. In some embodiments, the controller 712A may be a computing a layer 2 gateway, such as the layer 2 gateway device 275 (FIG. 2). The logical router 712B, logical switch 712C and logical node 712D may be software application substantially similar to the logical router 230, logical switch 220, 225, 250 and 255, and the logical node 201, 215, 240 and 245, as shown in FIG. 2. The tables 712E may be layer 2 gateway device tables such as tables 305, 310, and 350, as shown in FIG. 3. These programs and data structures are illustrated in FIG. 1-6 as being included within the memory 712 in the computing device 700; however, in other embodiments, some or all of them may be on different computer systems and may be accessed remotely, e.g., via a network 730. The computing device 700 may use virtual addressing mechanisms that allow the programs of the computing device 700 to behave as if they only have access to a large, single storage entity instead of access to multiple, smaller storage entities. Thus, while the components and data shown in FIG. 1-6 are illustrated as being included within the memory 712, these components and data are not necessarily all completely contained in the same storage device at the same time. Although the components and data shown in FIG. 1-6 are illustrated as being separate entities, in other embodiments some of them, portions of some of them, or all of them may be packaged together.

In an embodiment, the components and data shown in FIG. 1-6 may include instructions or statements that execute on the processor 706 or instructions or statements that are interpreted by instructions or statements that execute the processor 706 to carry out the functions as further described below. In another embodiment, the components shown in FIG. 1-6 may be implemented in hardware via semiconductor devices, chips, logical gates, circuits, circuit cards, and/or other physical hardware devices in lieu of, or in addition to, a processor-based system. In an embodiment, the components shown in FIG. 1-6 may include data in addition to instructions or statements.

FIG. 7 is intended to depict representative components of the computing device 700. Individual components, however, may have greater complexity than represented in FIG. 7. In FIG. 7, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 7 may be implemented, in various embodiments, in a number of different ways, including using various computer applications, routines, components, programs, objects, modules, data structures etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
a software defined networking network (SDN network) comprising node element and router element, the router element having components executing on two or more computing devices;
a physical network comprising physical network elements;
a controller to control a flow network information through the SDN network; and
a data link layer (layer 2) gateway device configured to:
receive, from the controller, routing data to a computing device of the two or more computing devices, the computing device selected to receive a packet transmitted from the physical network to the SDN network;
receive, from a first element of the physical network elements, an address request for a layer 2 address of a router element in the SDN network, the address request including a networking layer address of the router element;
transmit, to the first element in response to receiving the request for the data link layer address, the layer 2 address of the router element using the routing data;
receive, from the first element, a routing request to route the packet to a destination element in the SDN network using the layer 2 address; and
route the received packet to the selected computing device.

2. The system of claim 1, wherein the router element and the node element are connected between distinct computing devices using a network tunnel, and the layer 2 gateway device is further configured to:
determine, based on the layer 2 address, header information for routing the received packet through the network tunnel to a component of the router element executing on the selected computing device; and
encapsulate the received packet in the header information.

3. The system of claim 1, wherein the controller is configured to:
store routing data indicating a network interface on the router element to receive the packet transmitted from the node element to the first element.

4. The system of claim 1, wherein the physical network stores routing information indicating a network interface on the router element to receive the packet transmitted from the first element to the node element.

5. The system of claim 1, wherein the router element comprises components executing on each computing device of the two or more computing devices.

6. The system of claim 1, wherein the SDN network is mapped to a second element of the physical network elements through a network tunnel.

7. The system of claim 1, wherein the SDN network comprises two or more SDN sub networks, and at least one of the two or more SDN sub networks comprise at least a second element of the physical network elements.

8. The system of claim 1, wherein the controller is configured to a computing device to receive a packet transmitted to the SDN network in response to determining that the computing device has a greater capacity to process the transmitted packet than other available computing devices.

9. The system of claim 1, wherein the router element is a distributed logical router.

* * * * *